United States Patent
Ocampo et al.

(10) Patent No.: US 9,615,035 B2
(45) Date of Patent: Apr. 4, 2017

(54) COMPETITIVE PHOTO RIG

(71) Applicant: Microsoft Corporation, Redmond, WA (US)

(72) Inventors: Peter Ocampo, Bothell, WA (US);
Stacey Terrien, Kirkland, WA (US);
Priscila Palatini, Kenmor, WA (US);
Noel Franus, Louisville, CO (US);
Dheyvi Velagapudi, Boulder, CO (US);
Ryan Nikolaidis, Longmont, CO (US);
Kevin Mullen, Longmont, CO (US);
Scott Potter, Boulder, CO (US); Filip Wouters, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 56 days.

(21) Appl. No.: 14/020,925

(22) Filed: Sep. 9, 2013

(65) Prior Publication Data
US 2014/0340577 A1 Nov. 20, 2014

Related U.S. Application Data

(60) Provisional application No. 61/825,077, filed on May 19, 2013.

(51) Int. Cl.
*H04N 5/225* (2006.01)
*H04N 5/247* (2006.01)
(Continued)

(52) U.S. Cl.
CPC ............ *H04N 5/247* (2013.01); *F16M 13/04* (2013.01); *G03B 17/56* (2013.01); *G03B 17/563* (2013.01);
(Continued)

(58) Field of Classification Search
USPC ...................................... 348/218.1, 373, 375
See application file for complete search history.

(56) References Cited

U.S. PATENT DOCUMENTS

| | | | | |
|---|---|---|---|---|
| 4,941,009 A | * | 7/1990 | Yoshida | ......................... 396/121 |
| 7,292,271 B2 | * | 11/2007 | Okano | ................... H04N 5/222 |
| | | | | 348/218.1 |

(Continued)

OTHER PUBLICATIONS

"Firing Multiple Cameras at the Same Time", Retrieved at <<http://breezesys.com/MultiCamera/release.htm>>, Dec. 8, 2007, pp. 3.
(Continued)

*Primary Examiner* — Ngoc-Yen Vu
(74) *Attorney, Agent, or Firm* — Mark K. Young; Mayer & Williams PC

(57) ABSTRACT

A specialized multi-smartphone rig is configured to simultaneously hold and operate multiple camera-equipped smartphones to enable capture of the same image by each camera under identical conditions using a single shutter release button on the rig. Because smartphones typically vary in how much time they use to process user input, custom native applications ("apps") are installed on each smartphone to enable the cameras to operate in a synchronized manner. When the button is actuated, a signal is received at a microcontroller which hosts a server. The shutter release signal is passed to the server which, in turn, sends individual control signals to the custom native apps according to a timing model. When the custom native apps receive their respective control signals, they trigger their respective smartphone cameras to operate so that all the photos are captured in parallel across the rig at the same time.

11 Claims, 21 Drawing Sheets

(51) Int. Cl.
*G08B 13/196* (2006.01)
*F16M 13/04* (2006.01)
*G03B 17/56* (2006.01)
*H04N 5/232* (2006.01)
*H04M 1/04* (2006.01)

(52) U.S. Cl.
CPC ........ *G08B 13/19632* (2013.01); *H04M 1/04* (2013.01); *H04N 5/2251* (2013.01); *H04N 5/23203* (2013.01); *H04M 2250/52* (2013.01)

(56) References Cited

U.S. PATENT DOCUMENTS

| | | | |
|---|---|---|---|
| 7,365,794 B2 * | 4/2008 | Yasui | 348/374 |
| 8,027,531 B2 * | 9/2011 | Wilburn | H04N 5/247 345/419 |
| 8,704,903 B2 * | 4/2014 | McClellan | 348/211.3 |
| 8,755,785 B2 * | 6/2014 | Gong et al. | 455/420 |
| 8,780,263 B2 * | 7/2014 | Orf | 348/373 |
| 9,039,307 B2 * | 5/2015 | Lecuna Aguerrevere | F16M 11/048 396/420 |
| 9,049,358 B2 * | 6/2015 | Miller | |
| 9,123,172 B2 * | 9/2015 | Sebring | G06T 15/205 |
| 9,185,303 B2 * | 11/2015 | Gustavsson | H04N 5/2351 |
| 2004/0119882 A1 * | 6/2004 | Maruno | B60T 8/324 348/375 |
| 2010/0172642 A1 * | 7/2010 | Orf et al. | 396/421 |
| 2012/0002062 A1 * | 1/2012 | Brown | F16M 11/04 348/208.99 |
| 2013/0005401 A1 * | 1/2013 | Rosenhan et al. | 455/557 |
| 2013/0120636 A1 | 5/2013 | Baer | |
| 2014/0209777 A1 * | 7/2014 | Klemin | F16M 13/04 248/544 |
| 2014/0341484 A1 * | 11/2014 | Sebring | 382/284 |
| 2015/0049167 A1 * | 2/2015 | Suzuki et al. | 348/45 |
| 2015/0076297 A1 * | 3/2015 | Parrill | 248/176.3 |

OTHER PUBLICATIONS

Hodson, Hal., "Linked Smartphones Catch the Action from All Angles", Retrieved at <<http://www.newscientist.com/article/mg21829125.500-linked-smartphones-catch-the-action-from-all-angles.html>>, Apr. 15, 2013, pp. 5.

"USB Remote", Retrieved at <<http://chdk.wikia.com/wiki/USB_Remote>>, Aug. 14, 2012, pp. 7.

"DSLR Remote Pro Multi-Camera", Retrieved at <<http://www.breezesys.com/MultiCamera/>>, Retrieved Date: May 27, 2013, pp. 4.

* cited by examiner

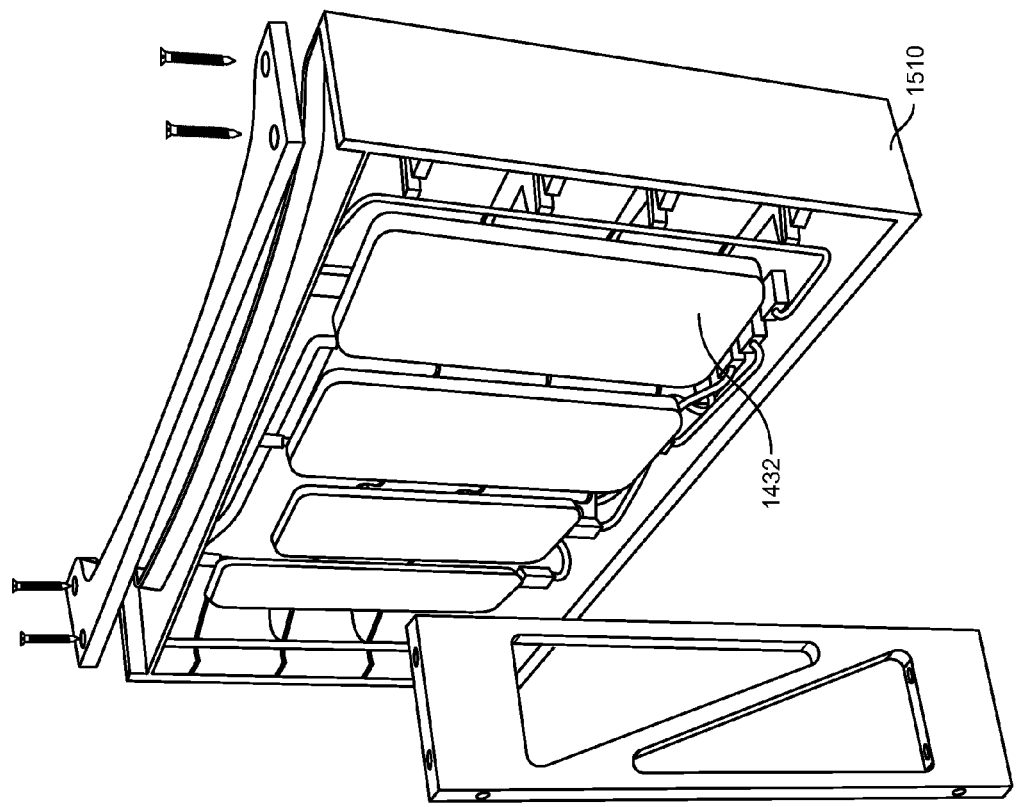
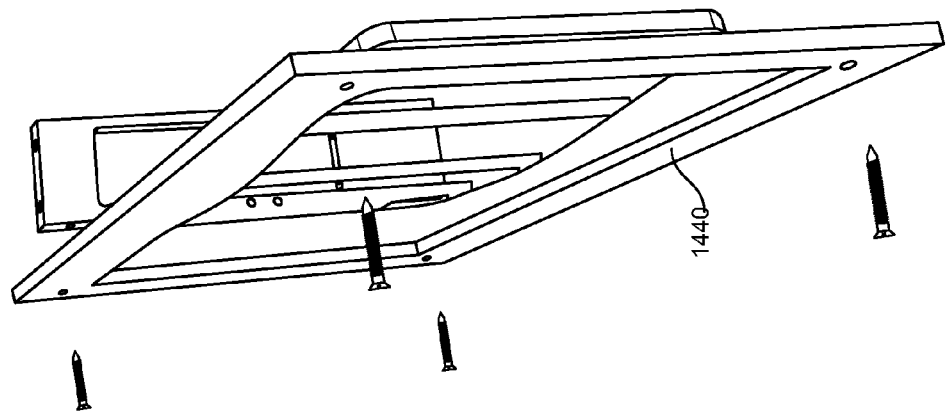
FIG 16

COMPETITIVE PHOTO RIG

STATEMENT OF RELATED APPLICATION

This application claims the benefit of provisional application No. 61/825,077 filed May 19, 2013, the disclosure of which is incorporated by reference herein.

BACKGROUND

Smartphones have been increasingly popular among consumers by supporting a wide variety of features and functions including still and video photography provided by a built-in camera. There are many factors which typically impact the quality of a photo, for example, lighting, photo composition, smartphone movement, and design considerations such as the physical placement of the camera within the smartphone. It can therefore be difficult to accurately compare camera performance of different smartphone models because the photos to be compared are taken at different times which results in changes to the conditions under which the photos are captured. These changes, regardless of how small, can lead to unfair advantages when attempting to capture the same photo which can make the performance comparison inaccurate or invalid.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

A specialized multi-smartphone rig is configured to simultaneously hold and operate multiple camera-equipped smartphones of disparate design to enable a photographer to capture the same image by each smartphone camera under identical conditions using a single shutter release button on the rig. Because smartphones typically vary in how much time they use to process user input, custom native applications ("apps") are installed on each smartphone in the rig to enable the cameras to operate in a synchronized manner so that the photos are captured at the same time. When the photographer actuates the single shutter release button, a signal is received at a microcontroller which hosts a server that is in operative communication with the custom native apps. The shutter release signal is passed as an asynchronous event to the server which, in turn, sends individual control signals to the custom native apps according to a timing model that takes into account the amount of time and other factors (for example, use of pre-focus light) applied by each respective smartphone when processing an input to then capture a photo. When the custom native apps receive their respective control signals, they trigger their respective smartphone cameras to operate so that all the photos are captured in parallel across the rig at the same time.

In various illustrative examples, the custom native apps are each written to implement native functionality through specific interaction with the particular operating system ("OS") that is initiated on a given smartphone. Each custom native app connects using a wireless router to the server which is configured to execute server-side JavaScript. In an alternative configuration, the connection between the server and custom native app is made via a wired path (or a combination of a wired path for some smartphones and a wireless path for others), for example using a connection through a data port such as a USB (Universal Serial Bus) port, a proprietary connector/port, or via the smartphone's headphone jack. When the custom native apps are launched on the smartphones, they are configured to connect to the server and provide a unique identifier to identify the particular smartphone type (i.e., manufacturer/model) so that the appropriate control signals can be fetched from the timing model.

An in-app button indicator displayed on each smartphone's user interface ("UI," e.g., a touchscreen) identifies the device as either connected to or disconnected from the server. Pressing the button will force the app to attempt to connect (or re-connect) to the server. Each app also shows a live feed from the camera. Via the custom native app, the live feed can be toggled on and off to preserve battery life. While connected, each custom native app listens for the control signal from the server. Upon receiving this signal each custom native app takes a photo, saves it to memory, displays it on the screen for three seconds, and returns to a 'ready' state.

In typical applications, the custom native apps are configured so that each of the smartphone cameras operates in its automatic or default mode of operation. That is, no adjustments or settings that might be available on a given smartphone to optimize the capture for particular conditions are utilized. In addition, flash features are also not typically used. The use of the automatic operating mode is believed to reflect the behaviors of most smartphone users as well as support a more direct and fair comparison of the captured photos.

In one illustrative embodiment, the specialized rig is configured as a shoulder rig in which portions of the rig are supported by the photographer's shoulder. In this embodiment some of the rig components including, for example, the microcontroller, router, and a rechargeable battery are disposed in a common housing which is located at an aft end of the shoulder rig's longitudinal frame. Twin handles are coupled together with a shallow inverted "U" which is attached at its center to the opposite, forward end of the frame. Individual smartphone mounts project upwards from a flat central portion of the inverted "U" and are arranged to fixedly but removably hold an array of smartphones in an orientation so the UI exposed by the smartphones are around eye level of the photographer when the shoulder rig is positioned for use and the camera objectives of the smartphones are positioned to capture images of scenes in front of the photographer. A single shutter release button that is adapted to simultaneously operate the individual cameras in the array of smartphones may be disposed on one of the handles or both handles in some cases. The shoulder rig is configured to enable the photographer to conveniently position the smartphone array in various orientations to capture photos in landscape and portrait modes, for example.

In another illustrative embodiment, the specialized rig is configured as a handheld device in which an array of disparate smartphones (each hosting a custom native app) is contained in a common housing that also includes a microcontroller and router and a rechargeable battery. The array of smartphones is typically hardwired to the router in the handheld device, or may be wired to the microcontroller directly in some implementations (in which case the router is not utilized). The back of the housing is configured to expose each smartphone's UI to a photographer. The objectives of the cameras are exposed through a window in the front of the housing. A shutter release button located on the housing is operatively coupled to the microcontroller so that a server supported thereon can receive a shutter release signal and provide control signals to the respective custom native apps using the appropriate timing from a timing model.

In another illustrative embodiment, the specialized rig is configured for use in a self-service booth that may be utilized, for example, as part of a retail store display, kiosk, advertising/information center, or similar facility. Here, an array of disparate smartphones (each instantiated with a custom native app) is located within a module that is mounted on an interior wall of the booth so that the camera objectives are positioned to simultaneously capture images of one or more subjects who are located within the interior of the booth. The interior wall is also typically equipped with a UI, such as one supported on a touchscreen flat panel display, that enables the subjects to see the images that will be photographed and/or control how and under what conditions the photos will be taken. The UI can also be configured so that subjects can interact with the various services and features that may be supported as part of the experience provided by the booth. For example, in some implementations, the UI may be configured to interactively answer questions and/or provide information about the smartphones and their associated features and functions, or supply business information such as pricing and service plans, or the like.

A printer, storage media reader/writer, wireless access point, or similar device may also be included in the booth or nearby to enable users to print out the photos captured in the booth or otherwise access/download them in digital form. For example, if five smartphones are included in the array in the booth, then the printout or digital download could include a side-by-side comparison of five photos. In some cases, multiple sets of photos can be provided where each set is captured under different lighting conditions (e.g., low light, full daylight, etc.) and/or using different backgrounds.

The booth is typically equipped with a door so that the interior of the booth can be substantially shielded from external/ambient light sources when in use. In some implementations, the interior of the booth can be variably lighted from low light conditions (such as might be present at dusk or on a starlit night) to full daylight conditions, as well as those in between to highlight differences in smartphone camera performance under a variety of lighting conditions. In addition, the interior wall of the booth opposite the smartphone array module can be arranged to include various patterns, markings, colors, or the like that can be used to highlight differences in smartphone camera performance with regard to color fidelity and the ability to capture fine details. These wall treatments may be variably implemented in some cases, for example, using scrollable flexible printed backgrounds as well as emissive or reflective displays. The variable lighting and backgrounds may be operated under computer control, for example.

Advantageously, the present competitive photograph rig enables smartphone camera performance to be compared in an unbiased and consistent manner.

It should be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DESCRIPTION OF THE DRAWINGS

FIGS. 14-17 show various views of an illustrative example of a competitive photo rig when configured as a handheld device;

Like reference numerals indicate like elements in the drawings. Elements are not drawn to scale unless otherwise indicated.

DETAILED DESCRIPTION

Figure 1:
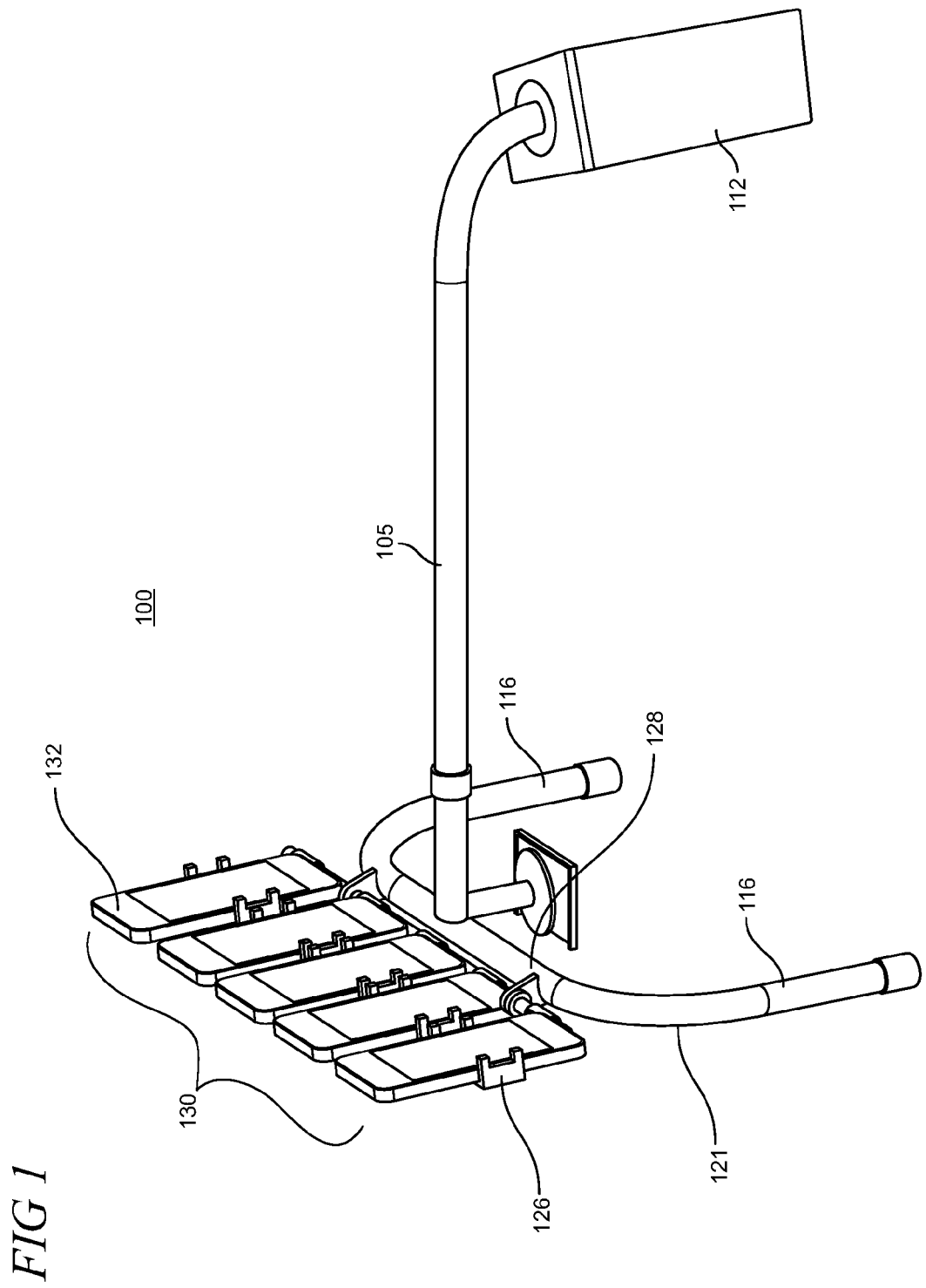
FIGS. 1 and 2 show an illustrative example of a competitive photo rig when configured as a shoulder rig.
Figure 2:
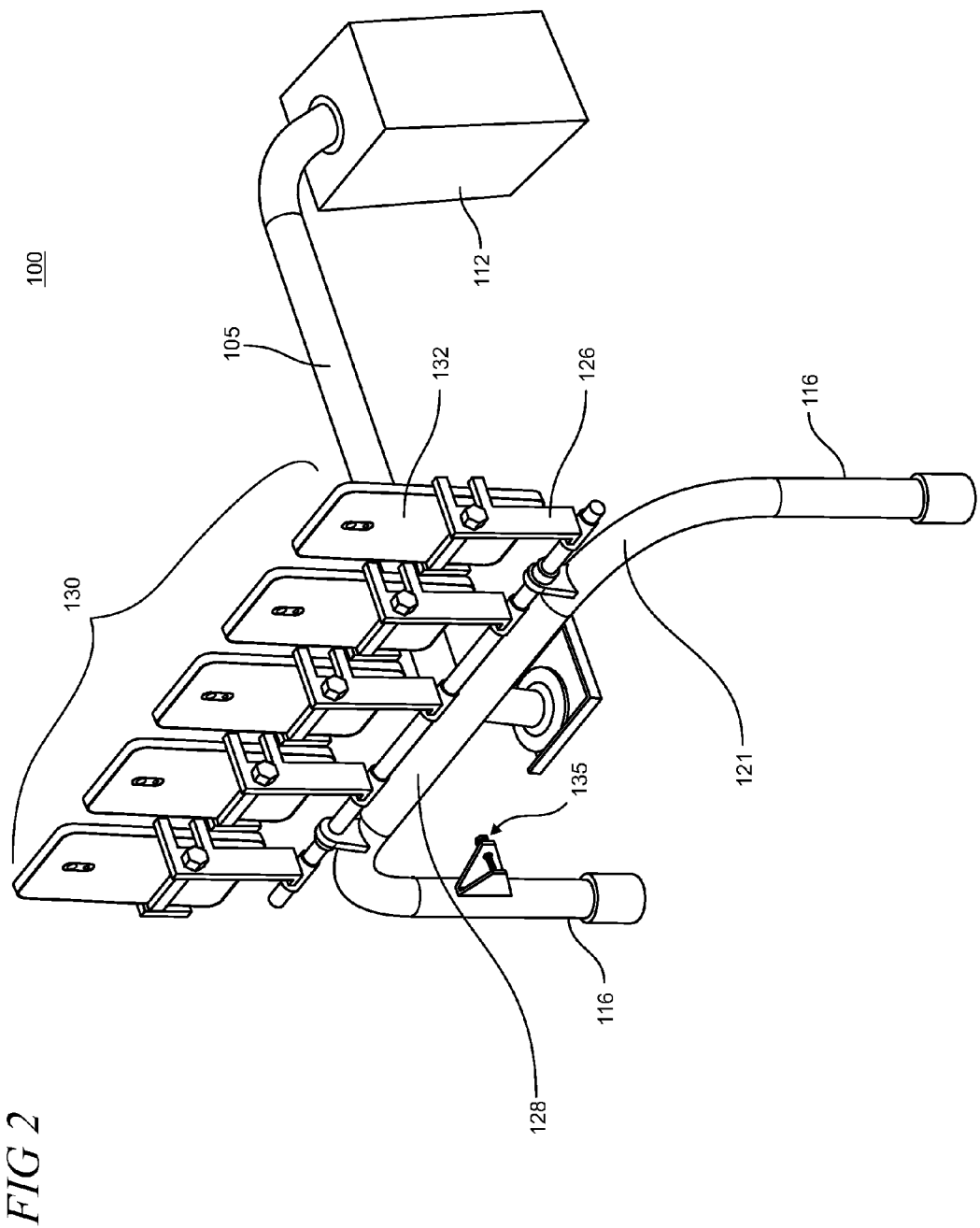

FIGS. 1 and 2 show an illustrative example of a competitive photo rig when configured as a shoulder rig 100. As shown, the shoulder rig 100 includes a longitudinal frame 105 that is connected to a housing for electronics 112 at its aft end. Twin handles 116 are coupled together with a shallow inverted "U" shaped member 121 that is attached at its center to the opposite, forward end of the frame 105. Individual smartphone mounts 126 project upwards from a flat central portion 128 of the inverted "U" shaped member. The mounts 126 are arranged to fixedly but removably hold an array 130 of smartphones (representatively indicated by reference numeral 132 in FIGS. 1 and 2). In this particular example, an array of five smartphones is utilized, but it is emphasized that such number is intended to be illustrative and that more or fewer smartphones may be utilized in the array 130 according to the requirements of a particular implementation of the competitive photo rig.

It is also noted that the smartphones in the FIGs are all drawn as a single generic smartphone design. However, in typical usage scenarios the smartphones may be expected to vary from one another in terms of form factor including size, shape, controls, control layout, features, feature location, and the like. It is emphasized that the smartphones 132 are shown and described here for illustrative purposes only. The present competitive photo rig and methods/techniques associated with it may be applied to any of a variety of electronic devices that include image capture capabilities. These devices may include, for example, smartphones, mobile phones, cell phones, personal digital assistants (PDAs), email appliances, handheld computing devices, handheld gaming platforms, tablets, laptop PCs (personal computers), personal media players, GPS (global positioning system) systems, navigation devices, cameras (including cameras having either or both still image and video image capture features), wearable computing devices, or devices combining various features provided by the any of the foregoing devices.

Figure 3:
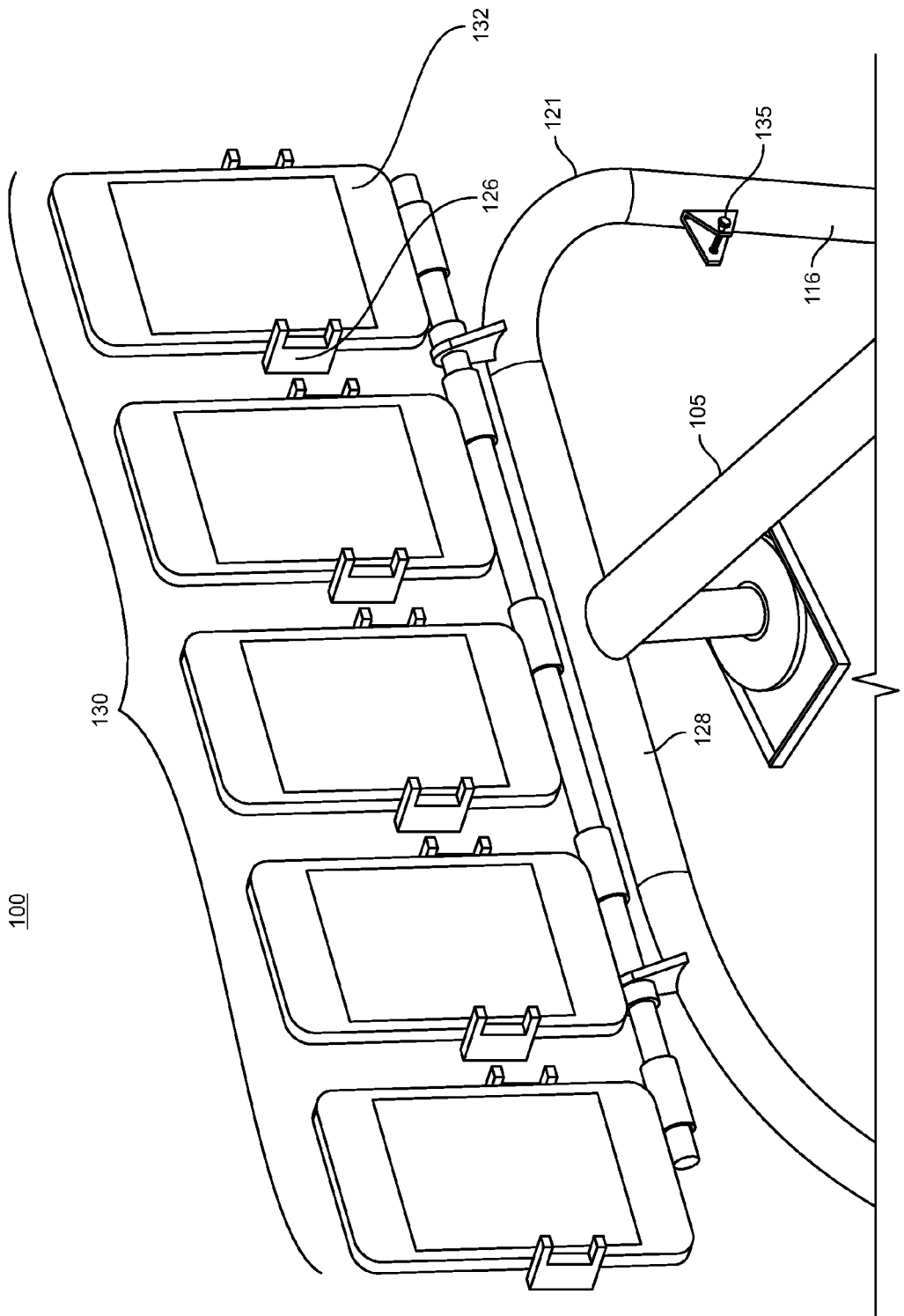
FIG. 3 shows a single shutter release button on one of the handles of the shoulder rig.

A single shutter release button 135 (or similar type of actuator) is mounted on one of the handles 116 as shown in FIGS. 2 and 3, that when actuated by a photographer using the shoulder rig 100, enables the smartphone array 130 to simultaneously capture multiple instances of the same image under identical conditions, as described in more detail below. While the shutter release button 135 is shown for right hand operation, the button may also be located on the left handle for left hand operation. In alternative implementations, a shutter release button may be included on both of the handles for actuation by either hand.

Figure 4:
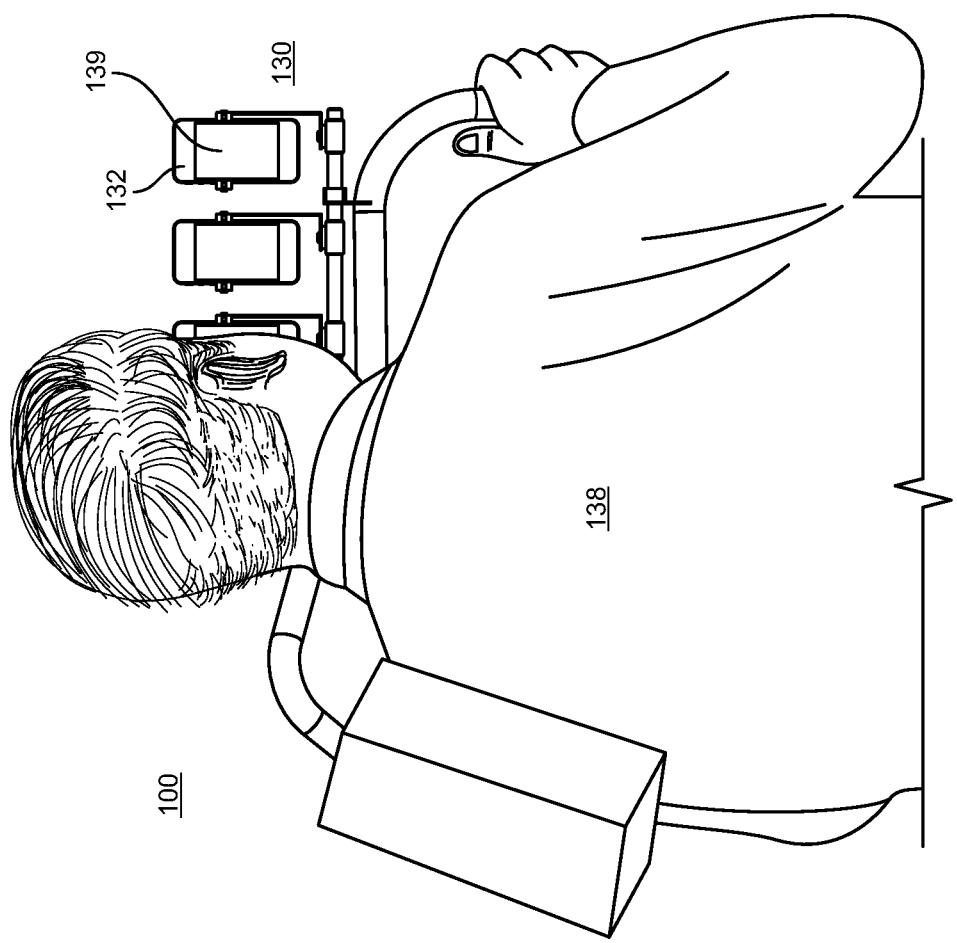
FIGS. 4-6 show the shoulder rig when in use by a photographer.
Figure 5:
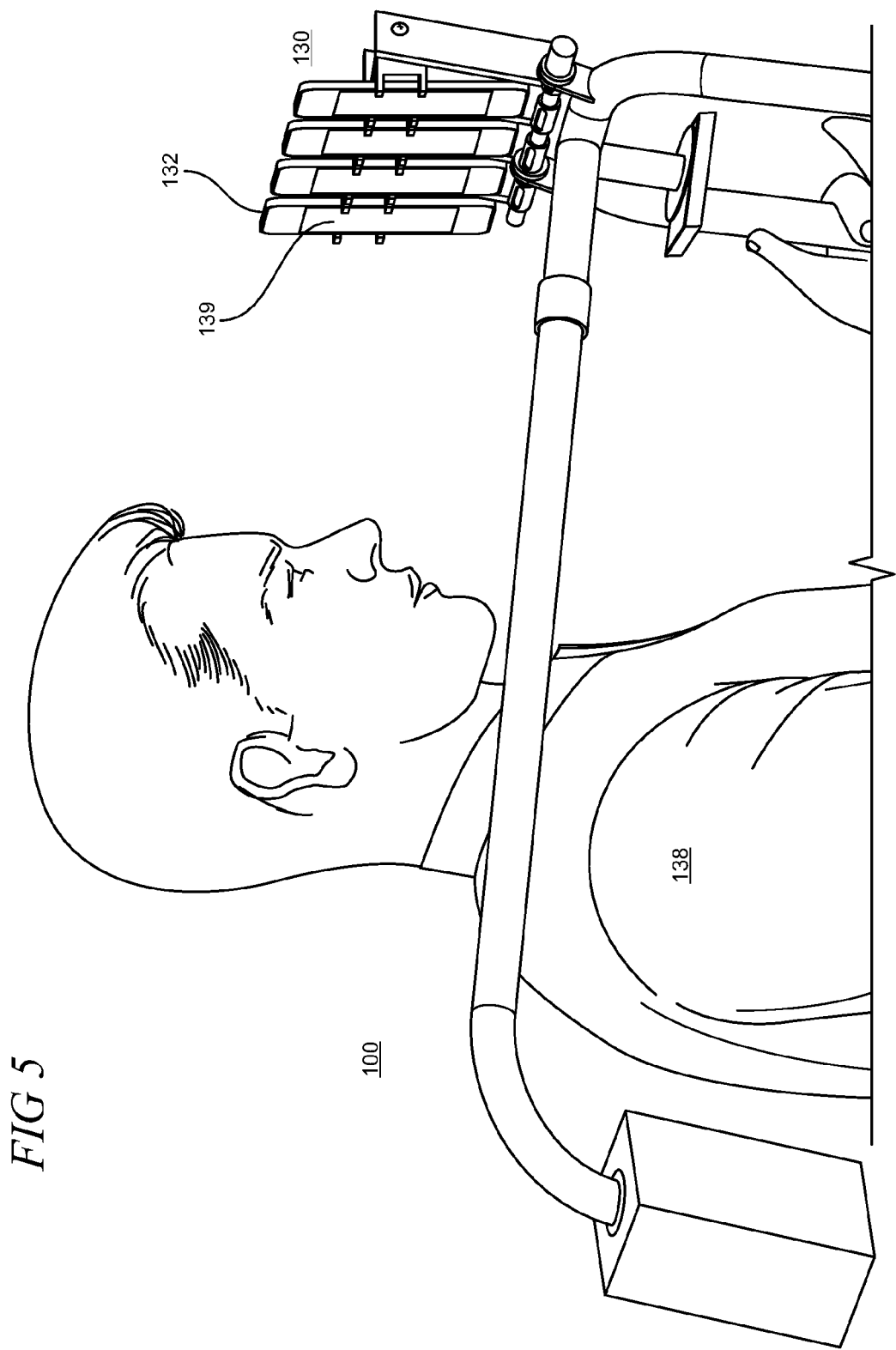
Figure 6:
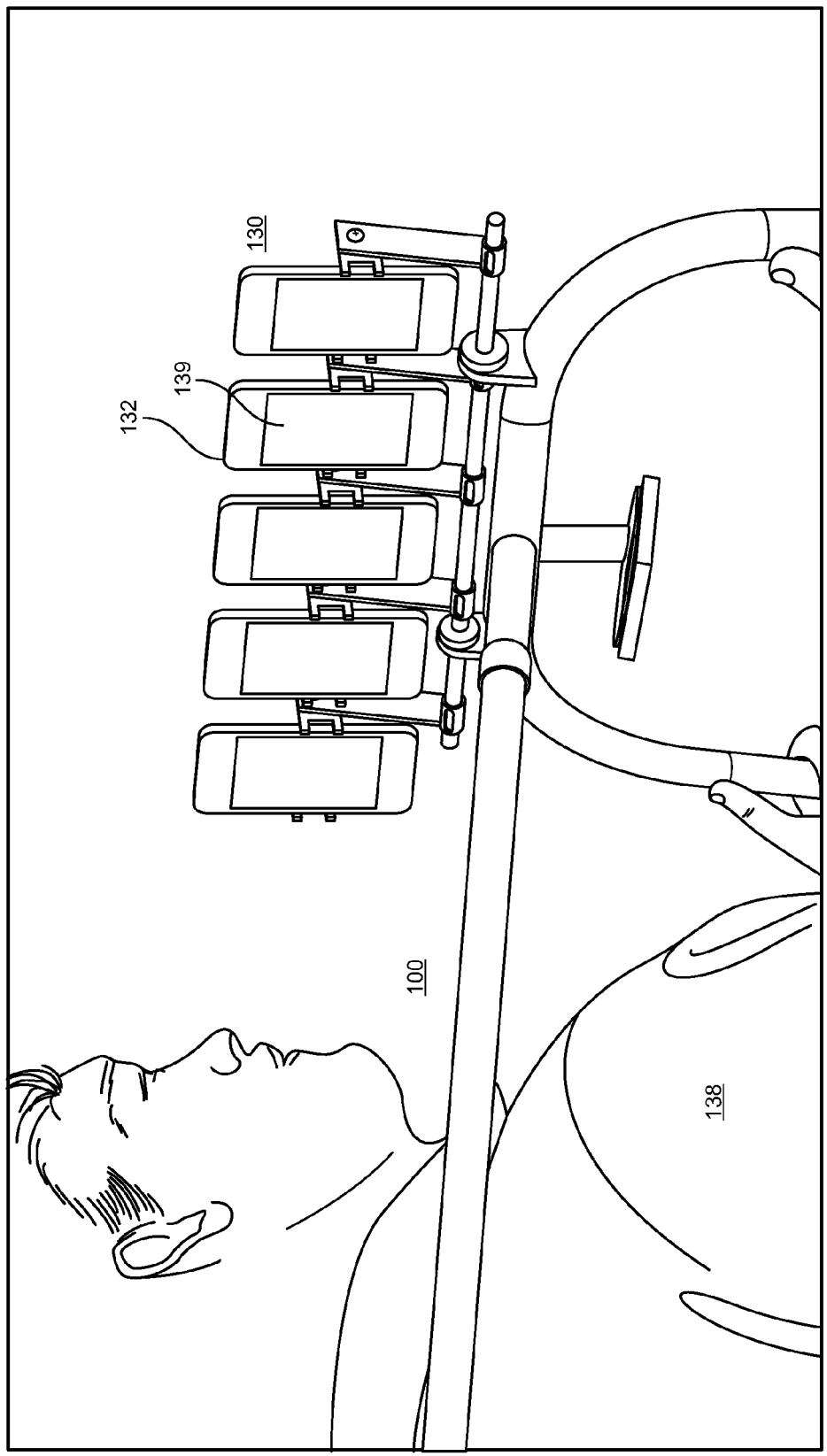
Figure 7:
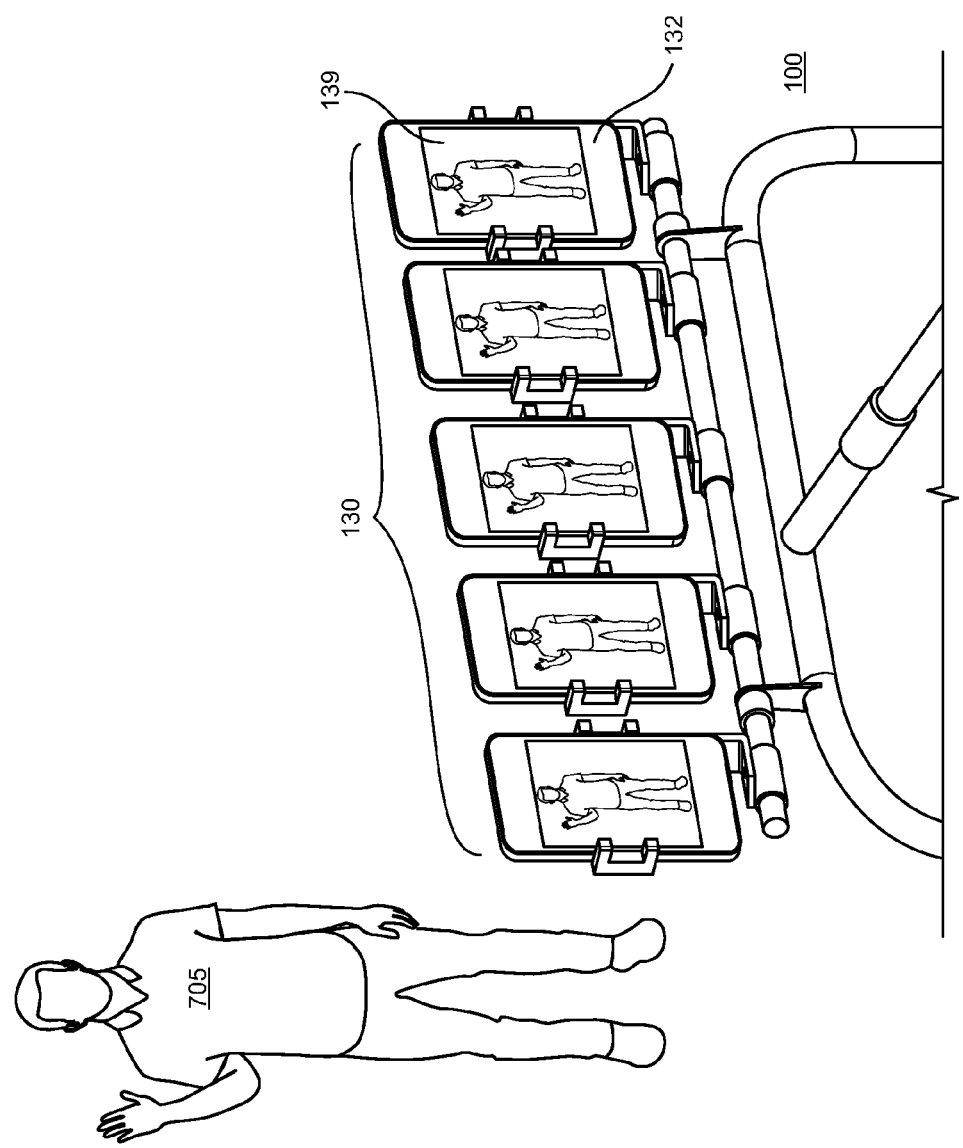
FIGS. 7 and 8 show illustrative details of the user interfaces ("UIs") exposed by the various smartphones in the array.
Figure 8:
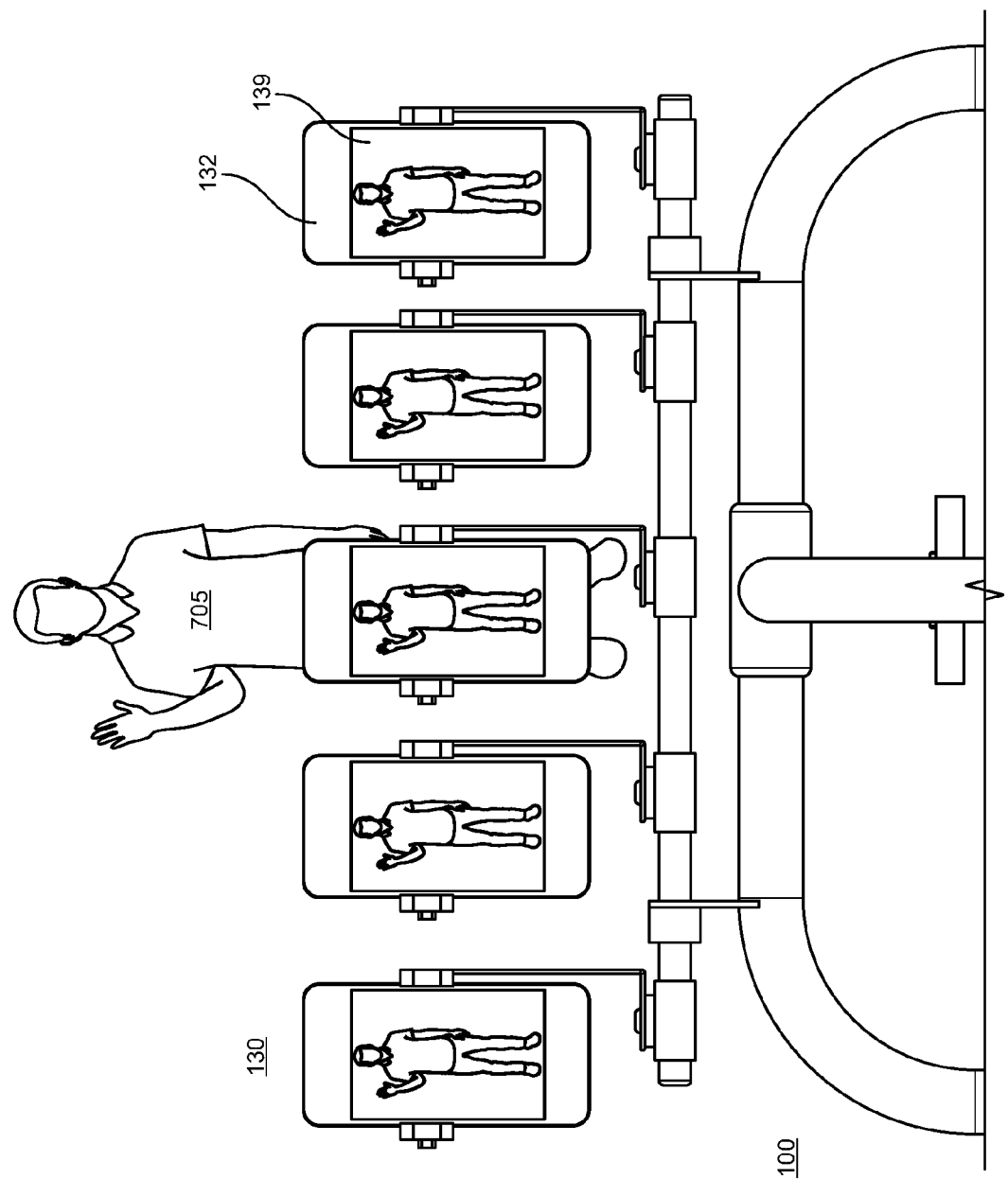
Figure 9:
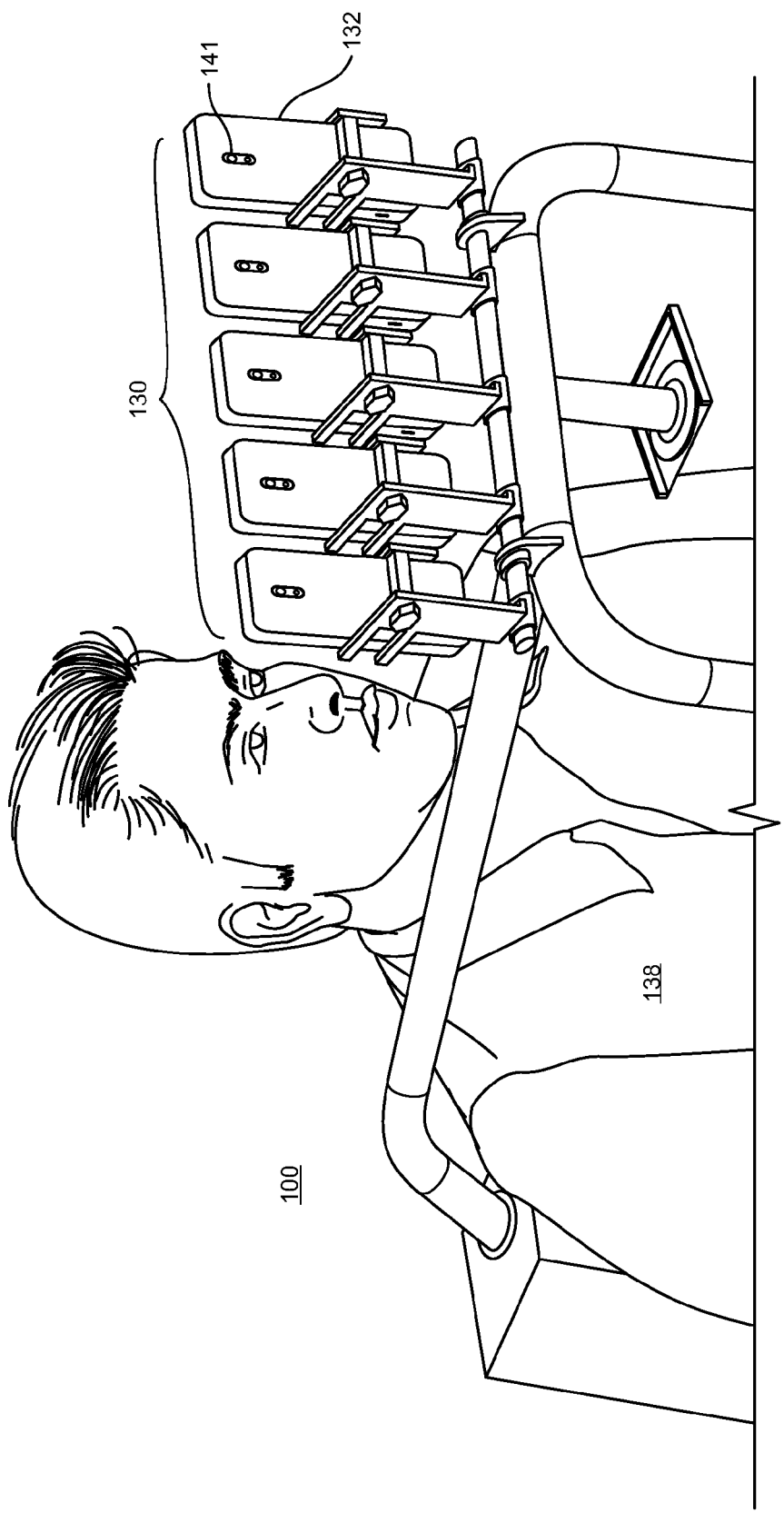
FIG. 9 shows how the camera objectives in the smartphone array are positioned on the shoulder rig to capture photographs of a scene in front of the photographer.

FIGS. 4-6 show the shoulder rig 100 when in use by a photographer 138 or other operator. As shown, the smartphone array 130 is orientated so that the UIs (representatively indicated by reference numeral 139) exposed by the smartphones 132 are approximately at eye level of the photographer 138 when the shoulder rig 100 is positioned for use. Illustrative details of the UIs 139 exposed by the various smartphones in the array 130 are shown in FIGS. 7 and 8. As shown, each smartphone 132 captures an image of a subject 705 in parallel across the array 130. In addition, as shown in FIG. 9, the camera objectives (as representatively indicated by reference numeral 141) of the smartphones 132 in the array 130 are positioned to capture images of scenes in front of the photographer 138.

Figure 10:
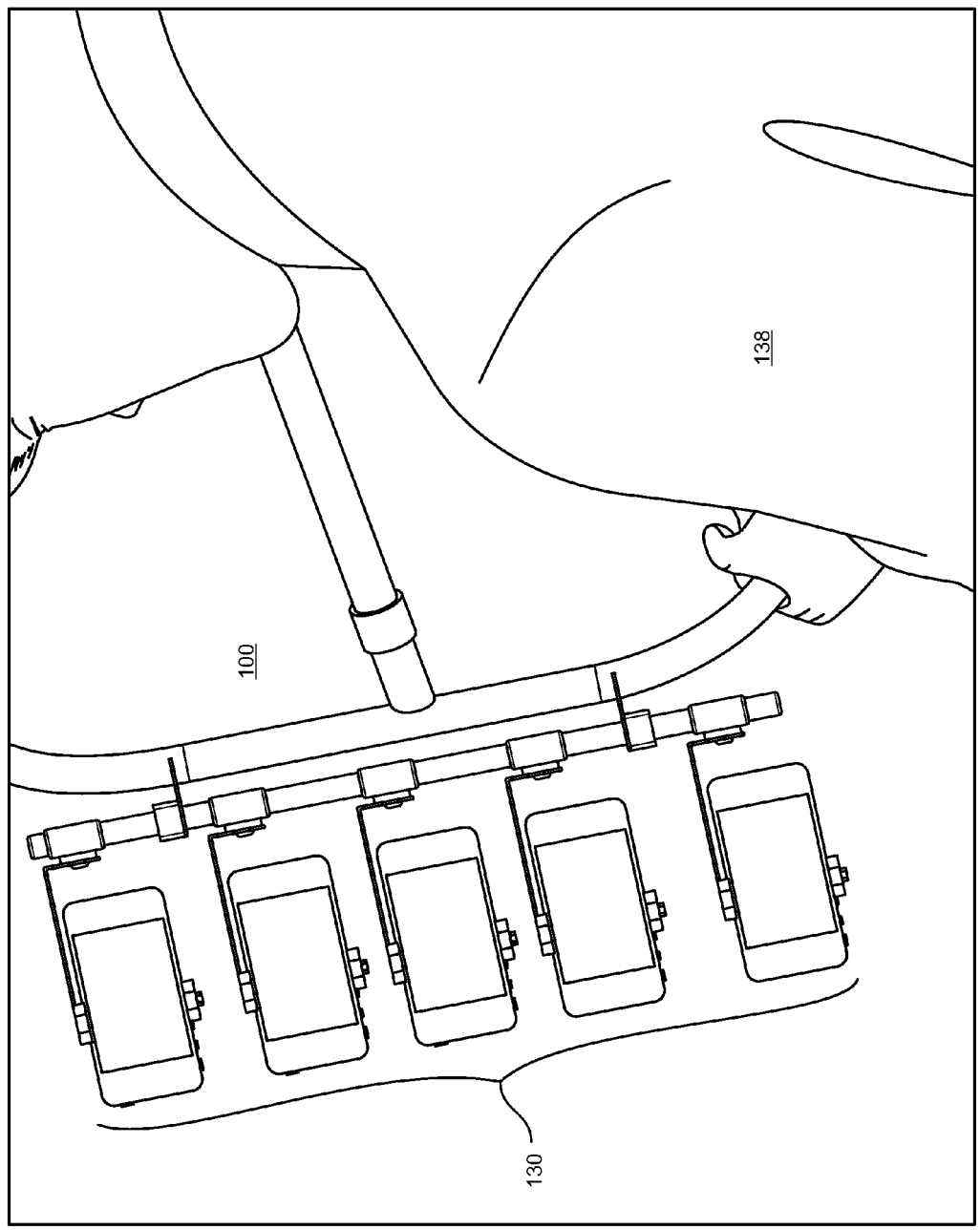
FIG. 10 shows how the shoulder rig may be used when the smartphone array is in a vertical orientation.

The shoulder rig 100 provides a way for the photographer 138 to readily manipulate the smartphone array 130 in order to compose shots having a variety of orientations. For example, FIG. 10 shows how the shoulder rig 100 may be used by the photographer 138 when the smartphone array 130 is in a vertical orientation.

Figure 11:
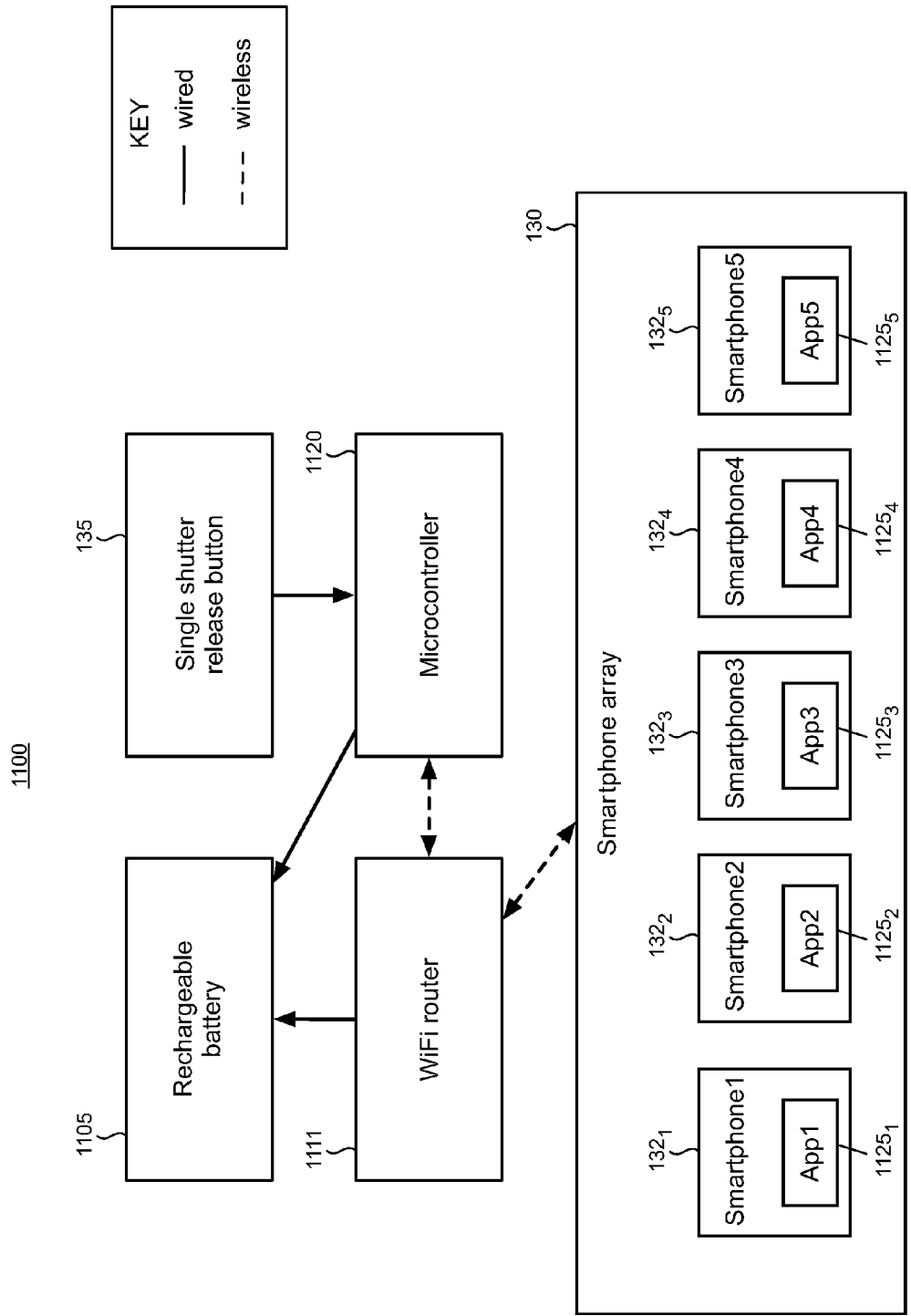
FIG. 11 is a block diagram of an illustrative example of functional components that may be used to implement portions of the present competitive photo rig.

FIG. 11 is a block diagram of an illustrative example of functional components 1100 that may be used to implement portions of the present competitive photo rig. In an exemplary embodiment, some of the functional components 1100 may be housed in the housing 112 (FIG. 1) of the shoulder rig 100 described above, for example, a rechargeable battery 1105, WiFi router 1111, and microcontroller 1120. The battery 1105 is typically implemented to power the WiFi router 1111 and microcontroller 1120 and associated components (not shown) and may also be utilized to provide power to supplement that provided by the smartphones' internal batteries in some cases.

Figure 12:
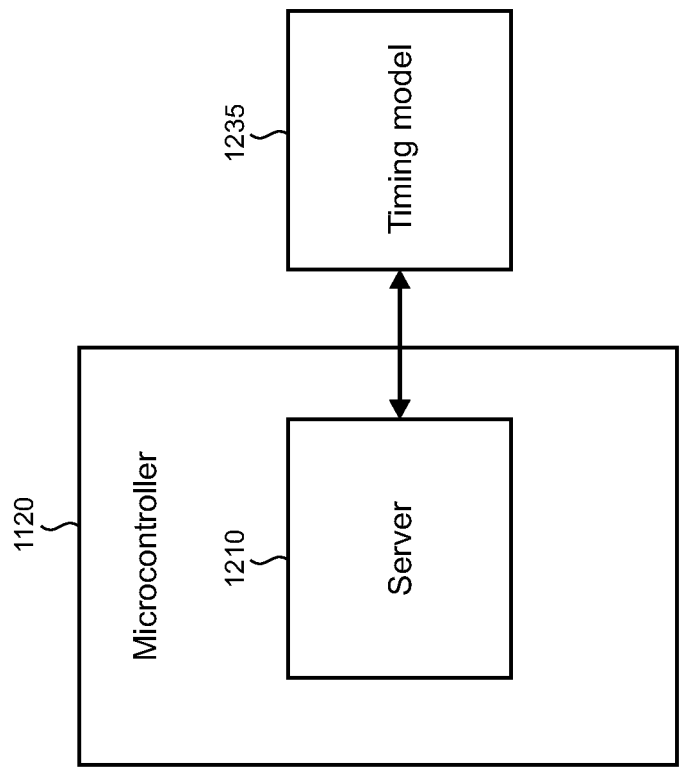
FIG. 12 is a block diagram of an illustrative example of functional components that are implemented using a microcontroller.

As shown in FIG. 11, the single shutter release button 135 is operatively coupled to the microcontroller 1120 via a wired connection. The microcontroller 1120 is configured to host a server 1210 as shown in FIG. 12. A timing model 1235 is accessible by the server 1210. The timing model takes account of the amount of time (i.e., the time interval) that each respective smartphone takes to process the input to then capture a photo, where the processing time can vary by smartphone manufacturer/model. The timing model may be implemented, for example, using memory associated with the microcontroller 1120 or implemented as part of the server 1210. When the single shutter release button is actuated by the photographer or user, a shutter release signal is passed as an asynchronous event to the server 1210 which, in turn, sends individual control signals to custom native apps $1125_{1,2\ldots5}$ that are instantiated on the smartphones in the array 130 according to the timing model that takes account of the amount of time that each respective smartphone 132 takes to process the input to then capture a photo. The timing model 1235 may also take other factors into account as well. For example, some smart phone models may utilize a pre-focus light or similar technique prior to capturing a photo.

The custom native apps 1125 are each written to implement native functionality through specific interaction with the particular OS that is installed and operative on a given smartphone 132. Each custom native app 1125 connects to the server 1210 hosted by the microcontroller 1120 through the WiFi router 1111 under the wireless IEEE 802.11 protocol. The server 1210 is configured to execute server-side JavaScript, in this particular example, as a node.js server. In an alternative configuration, the connection between the server 1210 and a custom native app 1125 may be made via a wired path (or a combination of a wired path for some smartphones and a wireless path for others), for example using a connection through a data port such as a USB port, a proprietary connector/port, or via the smartphone's headphone jack.

Figure 13:
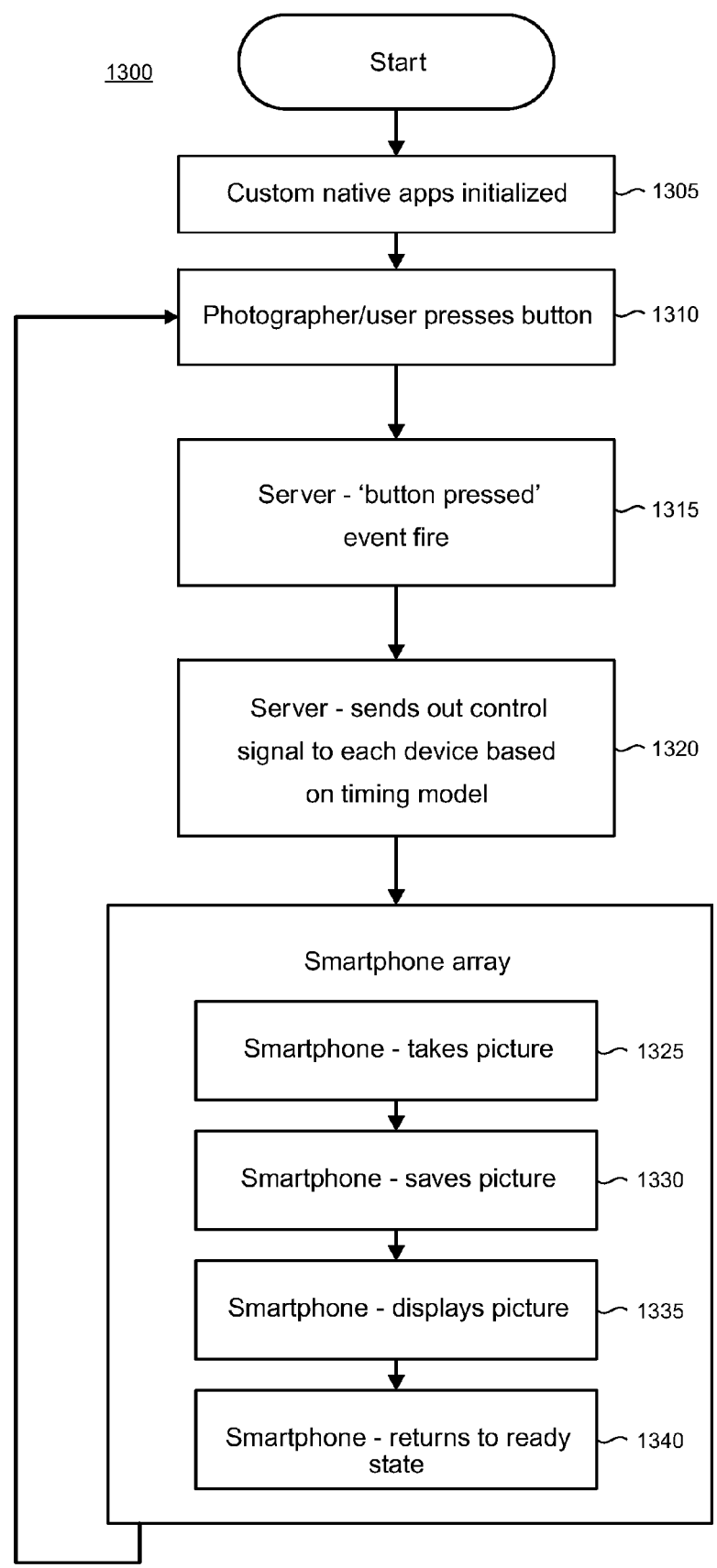
FIG. 13 is a flowchart of an illustrative method that may be implemented using the present competitive photo rig.

FIG. 13 is a flowchart of an illustrative method 1300 that may be implemented using the present competitive photo rig. When the custom native apps 1125 (FIG. 11) are launched on the smartphones, each is configured to initially connect to the server 1210 (FIG. 12) and provide a unique identifier to identify the particular smartphone type (i.e., manufacturer/model) so that the appropriate control signals can be fetched from the timing model 1235 (as indicated by reference numeral 1305). When a user (e.g., the photographer 138 in FIG. 4) actuates the single shutter release button (1310), a 'button press' event is fired (1315). Upon receipt of the event, the server 1210 sends out a control signal based on the timing model 1235 to each smartphone via its custom native app 1125 (1320). The control signals are typically staggered in time according to the timing model such that each of the smartphones (which typically vary in input processing as noted above) will take a picture at substantially the same time as the other smartphones in the array 130. Each smartphone in the array 130, upon receipt of its control signal from the server 1210 will take a picture (i.e., capture the photo) (1325), save it (1330), display it (1335), and then return to a ready state (1340). Control is then returned to block 1310 for the next actuation of the single shutter release button.

Figure 14:
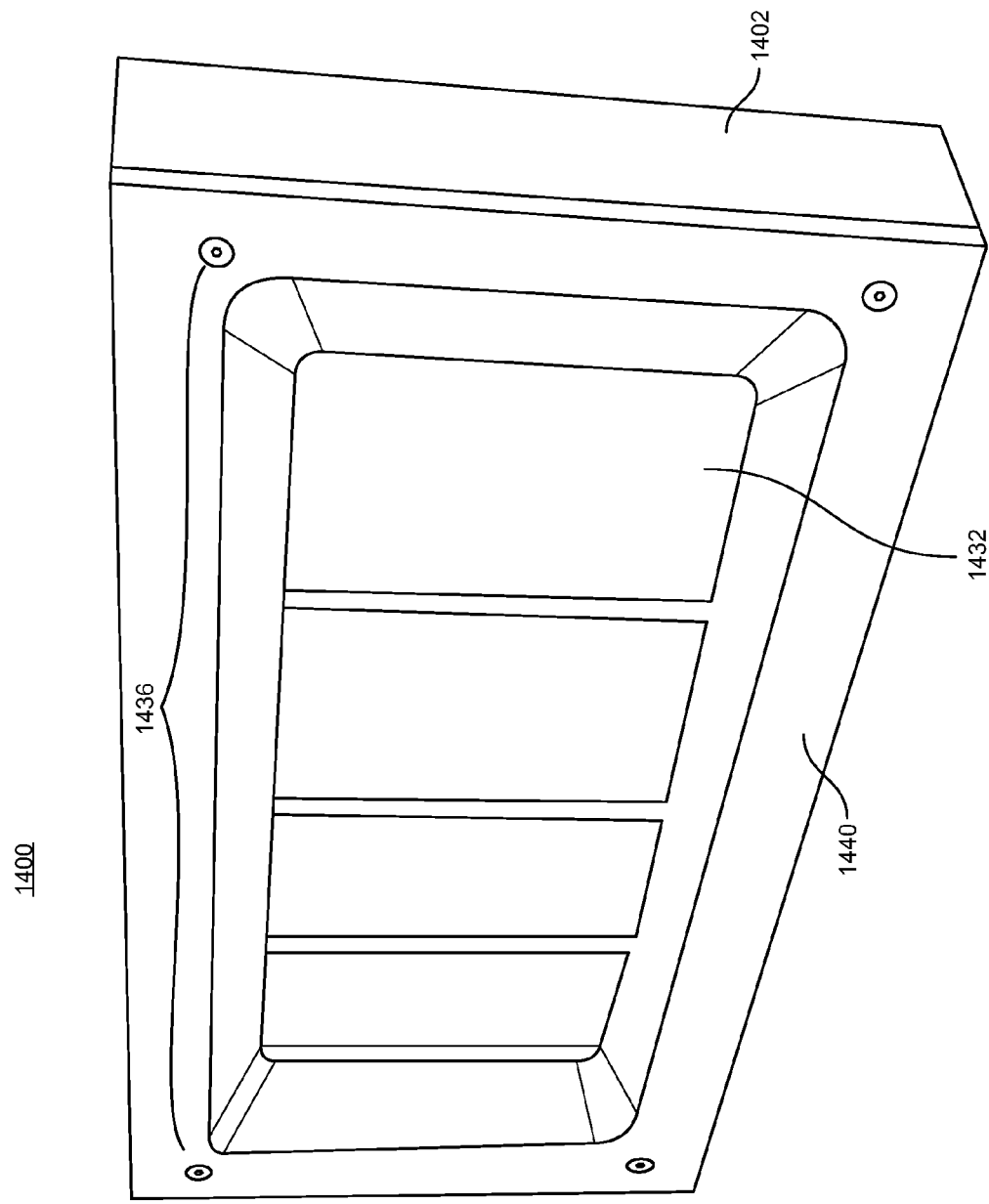
Figure 15:
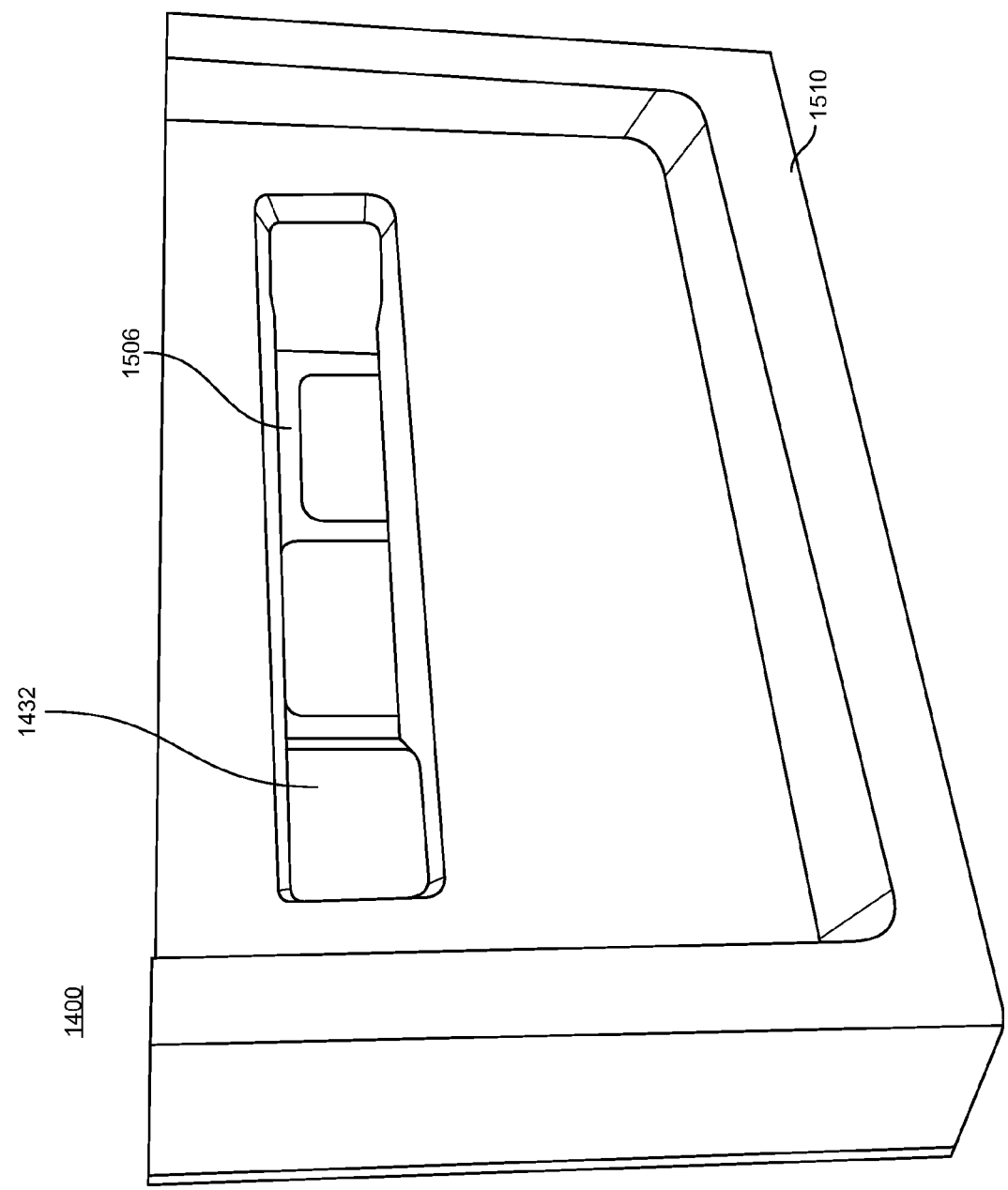

FIGS. 14-17 show various views of an illustrative example of a competitive photo rig when configured as a handheld device 1400. The handheld device 1400 commonly houses multiple smartphones 1432 in a housing 1402 to form an array 1436. A back portion 1440 of the handheld device housing 1402 is arranged to allow the UIs of the smartphones to be viewed by a photographer as shown in FIG. 14. The objectives of the cameras in the smartphones 1432 in the array 1436 are exposed through a window 1506 in the front portion 1510 of the housing 1402 as shown in FIG. 15. A shutter release button located on the handheld device housing (not shown) is operatively coupled to a microcontroller so that a server supported thereon can receive a shutter release signal and provide control signals to the respective custom native apps using the appropriate timing from a timing model in a similar manner to that shown in FIG. 12 and described in the accompanying text.

Figure 17:
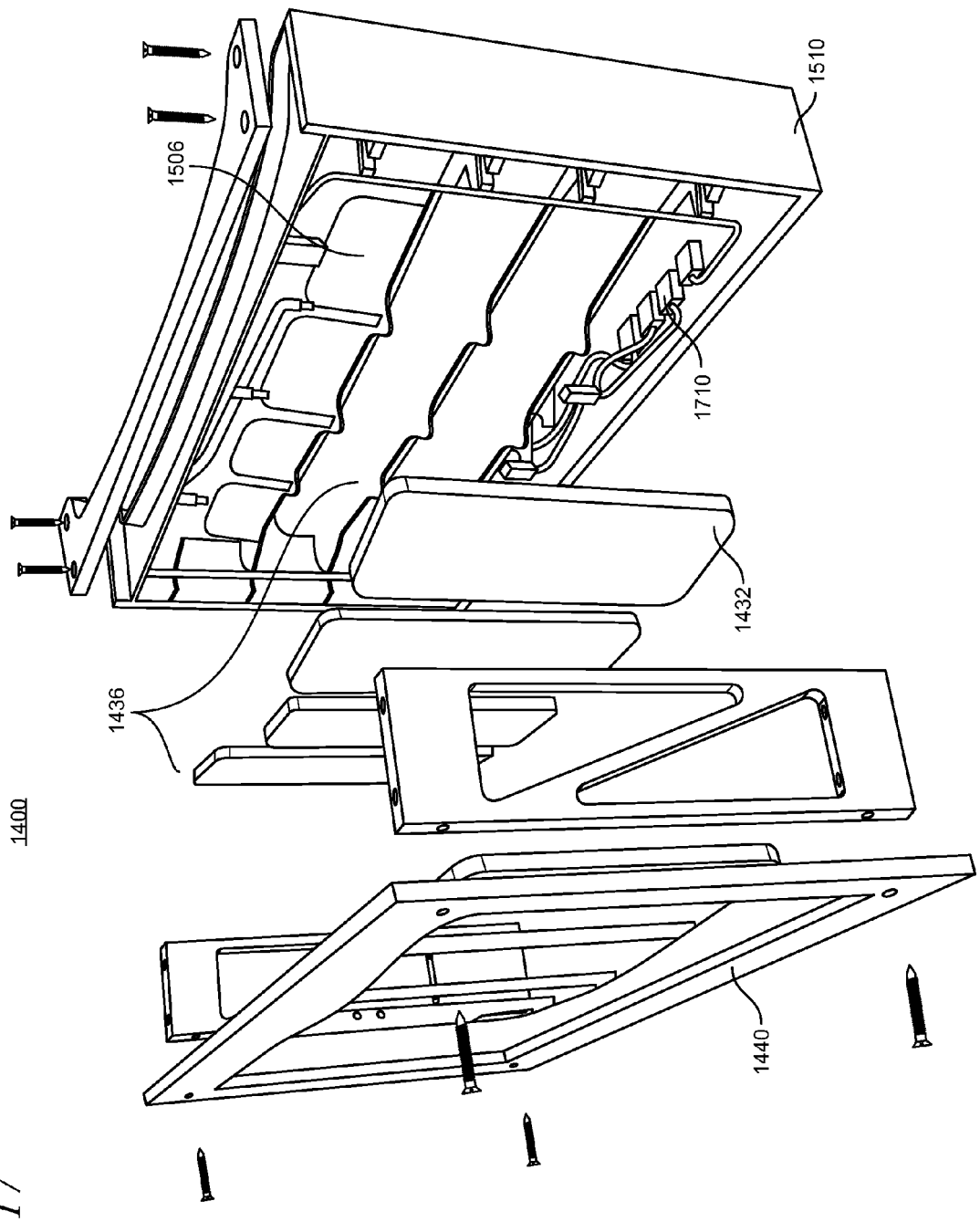

FIGS. 16 and 17 show an exploded assembly view of the handheld device 1400. As shown, the smartphones 1432 in the array 1436 are typically operatively coupled to the control circuitry (e.g., microcontroller/server as well as a router when utilized which are not shown in the drawing) using wired connections 1710. A battery (not shown), which may be rechargeable, may also be included within the housing of the handheld device 1400.

Figure 18:
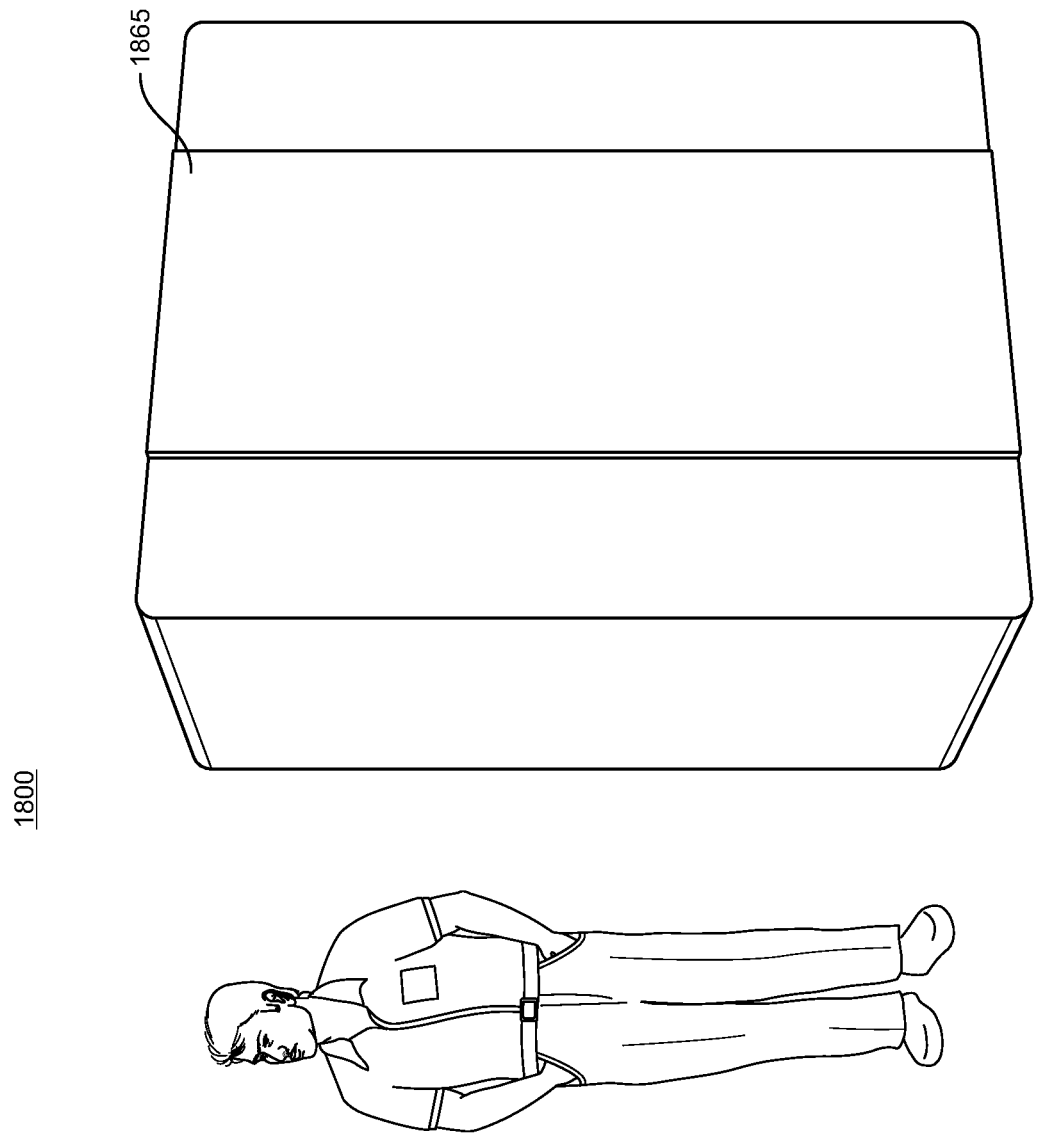
FIGS. 18-19 show pictorial views of an illustrative example of a competitive photo rig when configured for use in an enclosed booth as part of a retail display.
Figure 19:
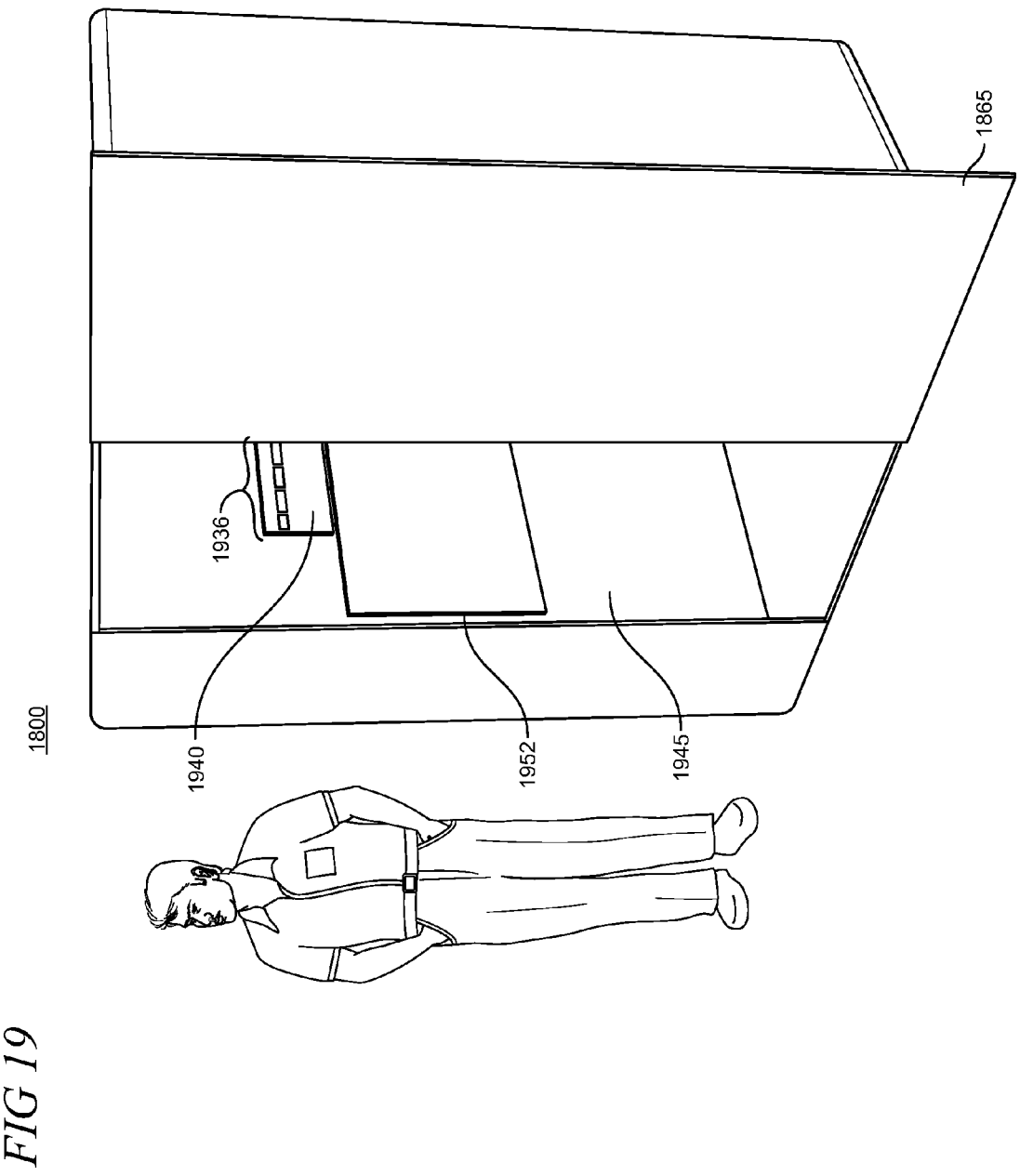
Figure 20:
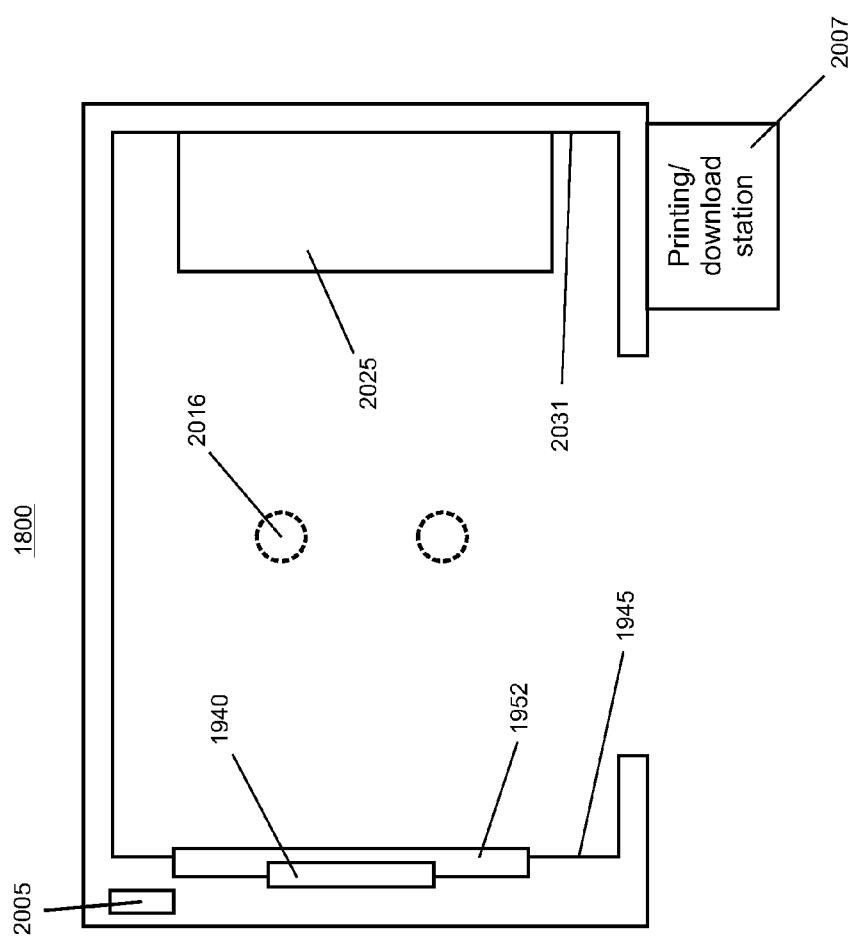
FIG. 20 shows a plan view of the interior volume of the booth.

FIGS. 18 and 19 show pictorial views of an illustrative example of a competitive photo rig when configured for use in and enclosed self-service booth 1800, for example, as part of a retail display, kiosk, or similar facility. FIG. 20 shows a plan view of the interior of the booth 1800.

As shown, an array 1936 of disparate smartphones (each instantiated with a custom native app) is located within a module 1920 that is mounted on or in an interior wall 1945 of the booth so that the camera objectives are positioned to substantially simultaneously capture images of one or more subjects who are located within the interior of the booth. A controller 2005, which may be similar to the microcontroller 1120 shown in FIG. 11 and described in the accompanying text, is utilized in the booth to provide the control signals to the smartphone array to enable the simultaneous photo capture by the array.

The interior wall 1945 is also typically equipped with a UI, such as one supported on a touchscreen flat panel display 1952, that enables the subjects to see the images that will be photographed and/or control how and under what conditions photos will be taken. The UI can also be configured so that subjects can interact with the various services and features that may be supported as part of the experience provided by the booth 1800. For example, in some implementations, the UI may be configured to interactively answer questions and/or provide information about the smartphone models used in the array 1936 and their associated features and functions, or supply business information such as pricing and service plans, or the like.

As shown in FIG. 20, a printer, storage media reader/writer, wireless access point, or similar device (collectively shown as a printing/download center 2007) may also be included in the booth 1800 or nearby to enable users to print out the photos captured in the booth or otherwise access/download them in digital form. For example, if five smartphones are included in the array 1936 in the booth 1800, then the printout or digital download could include a side-by-side comparison of five photos. In some cases, multiple sets of photos can be provided where each set is captured under different lighting conditions (e.g., low light, full daylight, etc.) and/or using different backgrounds.

The booth 1800 is equipped with a door 1865 so that the interior of the booth can be substantially shielded from external/ambient light sources when in use. The booth typically includes one or more light sources 2016 (as illustratively shown in FIG. 20—it is emphasized that the light sources can vary from what is shown). In some implementations, the interior of the booth can be variably lighted from low light conditions (such as might be present at dusk or on a starlit night) to full daylight conditions, as well as those in between to highlight differences in smartphone camera performance under a variety of lighting conditions. The booth may include seating 2025 arranged near the interior wall 2031 opposite the smartphone array module 1940.

Figure 21:
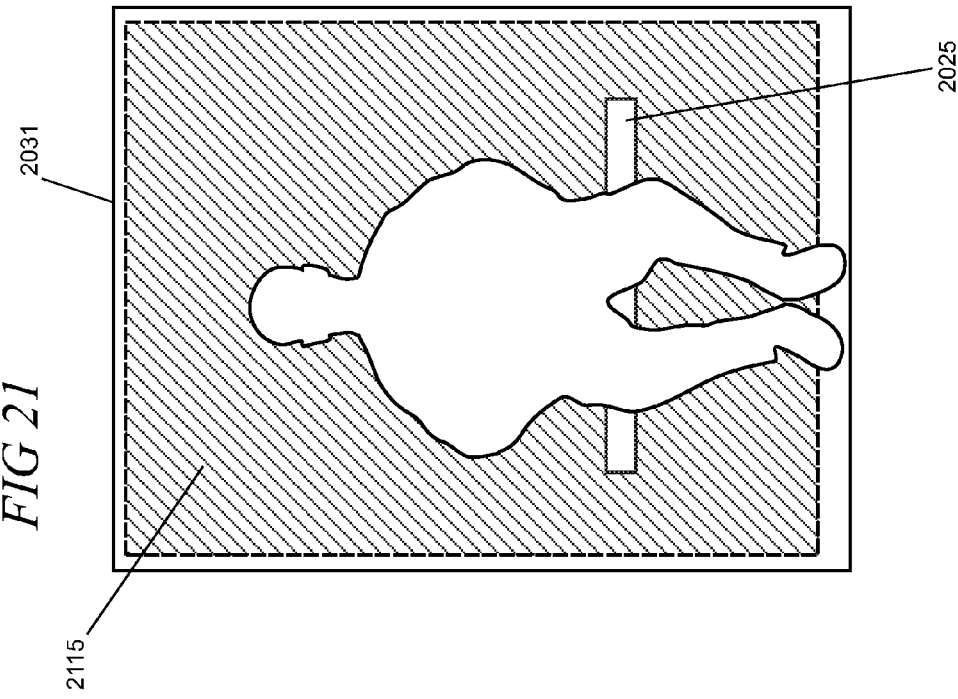
FIG. 21 shows an interior wall of the booth in which a background pattern, markings, or colors may be displayed for photographic capture along with a subject by an array of smartphone cameras.

In addition as shown in FIG. 21, the interior wall 2031 of the booth 1800 can be arranged to include various patterns, markings, colors or the like (collectively termed wall treatments and indicated by reference numeral 2115) that can be used to highlight differences in smartphone camera performance with regard to color fidelity and the ability to capture fine details. These wall treatments may be variably implemented in some cases, for example, using scrollable flexible printed backgrounds as well as emissive or reflective displays. The variable lighting and backgrounds may be operated under computer control, for example.

Figure 22:
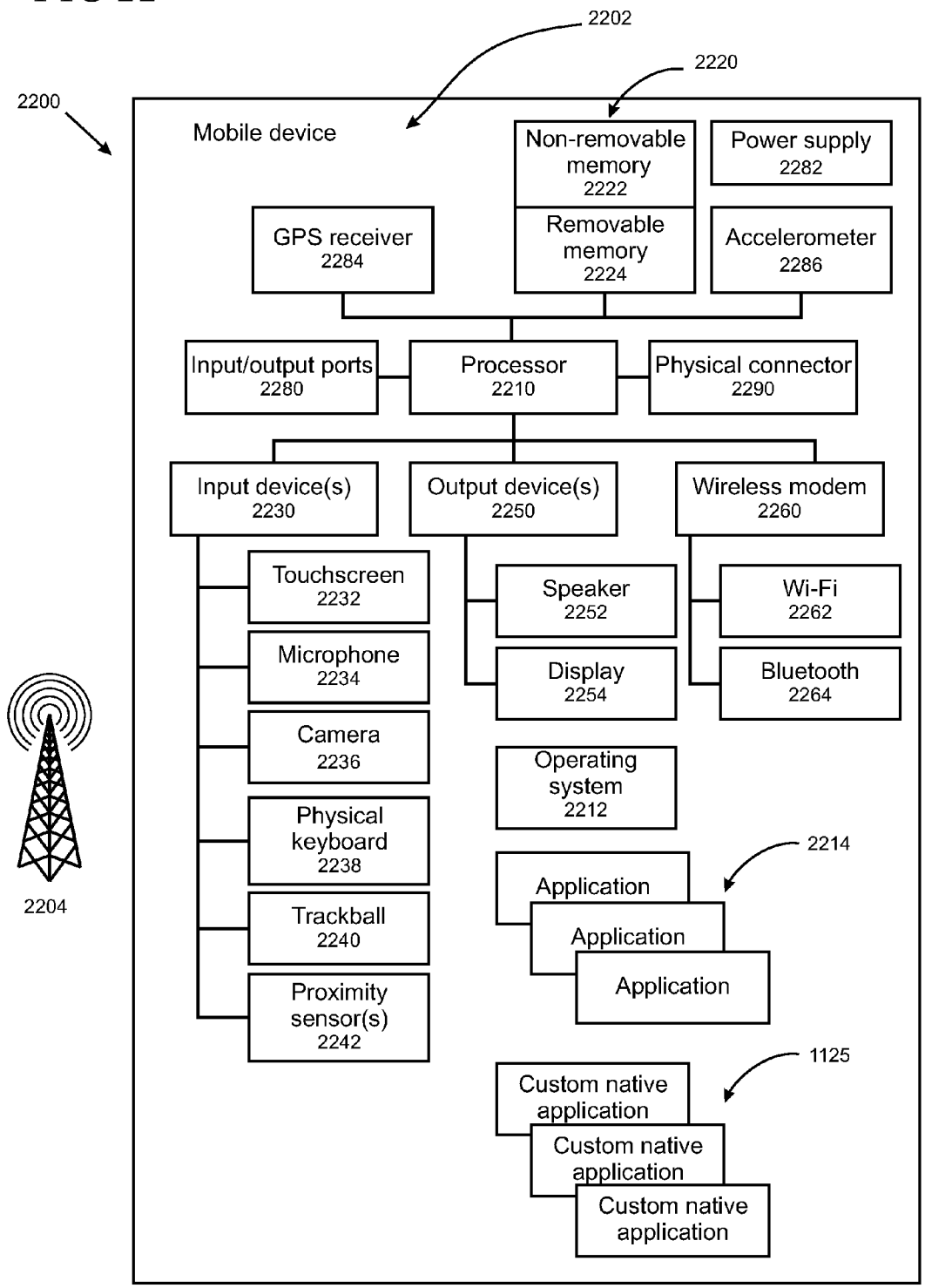
FIG. 22 is a block diagram of an illustrative example of functional components that may be used to implement portions of the present competitive photo rig.

FIG. 22 is a functional block diagram of an illustrative mobile device 2200 such as a smartphone including a variety of optional hardware and software components, shown generally at 2202. Any components 2202 in the mobile device can communicate with any other component, although, for ease of illustration, not all connections are shown. The mobile device can be any of a variety of computing devices (e.g., cell phone, smartphone, handheld computer, Personal Digital Assistant (PDA), etc.) and can allow wireless two-way communications with one or more mobile communications networks 2204, such as a cellular or satellite network.

The illustrated mobile device 2200 can include a controller or processor 2210 (e.g., signal processor, microprocessor, microcontroller, ASIC (Application Specific Integrated Circuit), or other control and processing logic circuitry) for performing such tasks as signal coding, data processing, input/output processing, power control, and/or other functions. An operating system 2212 can control the allocation and usage of the components 2202, including power states, above-lock states, and below-lock states, and provide support for one or more application programs 2214. The application programs can include common mobile computing applications (e.g., image-capture applications, email applications, calendars, contact managers, web browsers, messaging applications), or any other computing application. The operating system 2212 may also be configured to support and interact with the custom native apps 1125 (described above).

The illustrated mobile device 2200 can include memory 2220. Memory 2220 can include non-removable memory 2222 and/or removable memory 2224. The non-removable memory 2222 can include RAM, ROM, flash memory, a hard disk, or other well-known memory storage technologies. The removable memory 2224 can include flash memory or a Subscriber Identity Module (SIM) card, which is well known in GSM (Global System for Mobile communications) systems, or other well-known memory storage technologies, such as "smart cards." The memory 2220 can be used for storing data and/or code for running the operating system 2212 and the application programs 2214. Example data can include web pages, text, images, sound files, video data, or other data sets to be sent to and/or received from one or more network servers or other devices via one or more wired or wireless networks.

The memory 2220 may also be arranged as, or include, one or more computer-readable storage media implemented in any method or technology for storage of information such as computer-readable instructions, data structures, program modules or other data. For example, computer-readable media includes, but is not limited to, RAM (random access memory), ROM (read only memory), EPROM (erasable programmable read only memory), EEPROM (electrically erasable programmable read only memory), Flash memory or other solid state memory technology, CD-ROM (compact-disc ROM), DVD, (Digital Versatile Disc) HD-DVD (High Definition DVD), BLU-RAY, or other optical storage, magnetic cassettes, magnetic tape, magnetic disk storage or other magnetic storage devices, or any other medium which can be used to store the desired information and which can be accessed by the mobile device 2200. For purposes of this specification and the claims, the phrase "computer-readable storage media" and variations thereof, does not include waves, signals, transmission signals, and/or other transitory and/or intangible communication media.

The memory 2220 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment. The mobile device 2200 can support one or more input devices 2230, such as a touch screen 2232, microphone 2234 for implementation of voice input for voice recognition, voice commands and the like, camera 2236, physical keyboard 2238, trackball 2240, and/or proximity sensor 2242, and one or more output devices 2250, such as a speaker 2252 and one or more displays 2254. Other input devices (not shown) using gesture recognition may also be utilized in some cases. Other possible output devices (not shown) can include piezoelectric or haptic output devices. Some devices can serve more than one input/output function. For example, touch screen 2232 and display 2254 can be combined into a single input/output device.

A wireless modem 2260 can be coupled to an antenna (not shown) and can support two-way communications between the processor 2210 and external devices, as is well understood in the art. The modem 2260 is shown generically and can include a cellular modem for communicating with the mobile communication network 2204 and/or other radio-based modems (e.g., Bluetooth 2264 or Wi-Fi 2262). The wireless modem 2260 is typically configured for communication with one or more cellular networks, such as a GSM network for data and voice communications within a single cellular network, between cellular networks, or between the mobile device and a public switched telephone network (PSTN).

The mobile device can further include at least one input/output port 2280, a power supply 2282, a satellite navigation system receiver 2284, such as a Global Positioning System (GPS) receiver, an accelerometer 2286, a gyroscope (not shown), and/or a physical connector 2290, which can be a USB port, IEEE 1394 (FireWire) port, and/or RS-232 port. The illustrated components 2202 are not required or all-inclusive, as any components can be deleted and other components can be added.

Based on the foregoing, it should be appreciated that technologies for a competitive photo rig have been disclosed herein. Although the subject matter presented herein has been described in language specific to computer structural features, methodological and transformative acts, specific computing machinery, and computer readable storage media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed:

1. A method comprising the steps of:
    arranging a plurality of electronic devices in an array, each of the electronic devices including a camera and the array being configured so that respective cameras in the electronic devices are oriented to capture photos of a common scene,
        wherein the electronic devices include a step of instantiating a custom native application (app) on each of the electronic devices, each custom native app being configured for interoperability with an operating system (OS) executing on a given electronic device and further being adapted to receive a control signal that controls camera operation;
    configuring the devices so that the cameras are triggerable to capture the common scene at a substantially same point in time;
    providing a shutter release actuator for sending a shutter release signal that causes the cameras in the electronic devices in the array to be triggered to capture the scene at the substantially same point in time; and
    providing a control system for generating a plurality of control signals transmitted to respective ones of the custom native apps, the control system being configured to receive the shutter release signal from the shutter release actuator,
        wherein the control system includes a server and a timing model, the server being adapted to generate the control signals using the timing model, the timing model providing data that describes how each electronic device in the array operates when capturing a photo, such that the control signals are transmitted to respective apps staggered in time according to the timing model so that each camera is triggered at substantially the same time.

2. The method of claim 1 in which the electronic devices are selected from one of smartphone, mobile phone, cell phone, personal digital assistant (PDA), email appliance, handheld computing device, handheld gaming platform, tablet, laptop PC (personal computer), GPS (global positioning system) system, navigation device, still camera, video camera, wearable computing device, or a device combining features thereof.

3. The method of claim 1 in which the data describes an amount of time that elapses between receipt of a command to take a photo and the capture of the photo by an electronic device camera.

4. The method of claim 1 in which the data describes behavior of the electronic device camera associated with capture of the photo.

5. The method of claim 4 in which the behavior includes implementation of a pre-focus light.

6. A system, comprising:
    a frame;
    a handle attached to the frame at a fore end of the frame;
    a controller housing attached to an aft end of the frame;
    a shutter release actuator disposed on the frame;
    a plurality of cameras positioned so as to form an array, the array being removably attachable to the frame and configured so that respective cameras are oriented to capture photos of a common scene, each camera being instantiated in an electronic device hosting a custom native application (app) that is arranged to operate the camera responsively to a received control signal; and a controller, housed in the controller housing, configured for receiving a shutter release signal from the shutter release actuator when actuated and responsively generating control signals that are transmitted to respective apps, the generating being performed using a timing model describing, for each camera, a time interval that elapses between receipt of the control signal and capture of a photo of the common scene by the camera, wherein the frame and handle are configured so that a portion of the frame is located over a human operator's shoulder and the array is positioned at approximately eye level of the human operator during use of the system.

7. The system of claim 6 in which the controller comprises a microcontroller that hosts a server that is arranged for interoperability with each of the custom native apps.

8. The system of claim 6 in which the controller housing further houses a router over which communications are carried between a microcontroller and the electronic devices in the array.

9. The system of claim 8 in which the controller housing further houses a battery, the battery providing power to one of the microcontroller, router, or one or more electronic devices in the array.

10. A system, comprising:
a housing having a front portion and a back portion;
a shutter release actuator disposed on the housing;
a plurality of electronic devices positioned within the housing so as to form an array, each electronic device in the array including a camera and a user interface (UI) and hosting a custom native application (app) that is arranged to operate the camera responsively to a received control signal, the UIs of the electronic devices being exposed through one or more openings in the back portion of the housing and objectives of the cameras being exposed through one or more openings in the front portion of the housing, the array being configured so that respective cameras are oriented to capture photos of a common scene; and a controller receiving a shutter release signal from the shutter release actuator when actuated and responsively generating control signals that are transmitted to respective apps, the generating being performed using a timing model describing, for each camera, a time interval that elapses between receipt of the control signal and capture of a photo of the common scene by the camera.

11. The system of claim 10 further comprising:
a plurality of communication pathways between the controller and each electronic device in the array, the communication pathways comprising one of wireless communication pathways and wired communication pathways, the wired communication pathways including wired connections, the wired connections being coupled to an electronic device using one of a Universal Serial Bus (USB) connector, data port connector, or headphone jack connector.

* * * * *